United States Patent
Lando et al.

(10) Patent No.: US 10,658,959 B2
(45) Date of Patent: May 19, 2020

(54) POWER SUPPLY SYSTEM WITH FIRST AND SECOND AC VOLTAGE GENERATORS AND RESPECTIVE 6-PULSE RECTIFIER UNITS

(71) Applicant: Hamilton Sundstrand Corporation, Charlotte, NC (US)

(72) Inventors: Jean-Louis Lando, Toulouse (FR); Pierre Valin-Saunal, Aussonne (FR)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/431,006

(22) Filed: Jun. 4, 2019

(65) Prior Publication Data

US 2020/0083832 A1 Mar. 12, 2020

(30) Foreign Application Priority Data

Sep. 7, 2018 (EP) .................................... 18306176

(51) Int. Cl.
H02M 7/21 (2006.01)
H02P 9/30 (2006.01)
G05F 1/10 (2006.01)
H02K 19/34 (2006.01)

(52) U.S. Cl.
CPC ................ H02P 9/307 (2013.01); G05F 1/10 (2013.01); H02K 19/34 (2013.01); H02M 7/21 (2013.01)

(58) Field of Classification Search
CPC .......... H02P 9/307; H02K 19/34; H02M 7/21; G05F 1/10
See application file for complete search history.

(56) References Cited

U.S. PATENT DOCUMENTS

| 7,638,890 B2 | 12/2009 | Lando et al. | |
| 8,358,111 B2 | 1/2013 | Rozman et al. | |
| 8,680,707 B2 * | 3/2014 | Childs | H02P 25/22 307/9.1 |
| 9,197,138 B2 * | 11/2015 | Feng | H02M 7/06 |
| 9,692,311 B2 | 6/2017 | Kim et al. | |
| 2004/0202012 A1 | 10/2004 | Ferens | |
| 2010/0193630 A1 * | 8/2010 | Duces | H02J 3/02 244/58 |
| 2017/0332510 A1 * | 11/2017 | Sarti | H02M 7/06 |
| 2018/0029721 A1 * | 2/2018 | Mariotto | B64D 31/00 |

OTHER PUBLICATIONS

Extended European Search Report for International Application No. 18306176.1 dated Feb. 18, 2019, 6 pages.

* cited by examiner

Primary Examiner — Yusef A Ahmed
Assistant Examiner — Shahzeb K Ahmad
(74) Attorney, Agent, or Firm — Cantor Colburn LLP

(57) ABSTRACT

A power supply has first and second ac voltage generators. Both of the first and second ac voltage generators are connected to one or more loads and a respective 6-pulse rectifier unit for rectifying ac voltage from each of the first and second power generators to a dc voltage output for the loads, Both of the first and second ac voltage generators includes two 3-phase voltage sources separated by a phase shift. The voltage output from each rectifier unit is coupled to the loads via a respective interphase inductor.

6 Claims, 6 Drawing Sheets

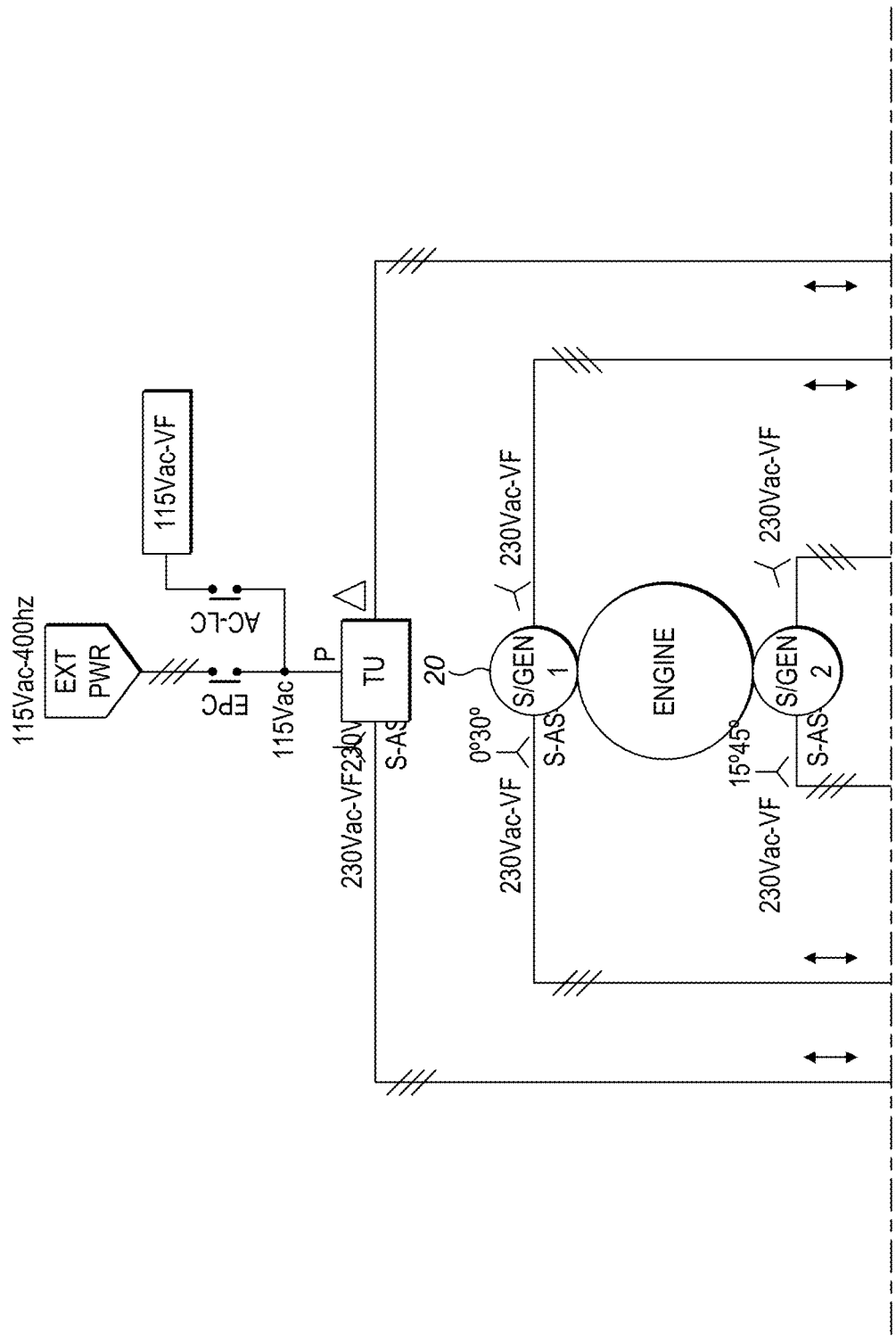

POWER SUPPLY SYSTEM WITH FIRST AND SECOND AC VOLTAGE GENERATORS AND RESPECTIVE 6-PULSE RECTIFIER UNITS

FOREIGN PRIORITY

This application claims priority to European Patent Application No. 18306176.1 filed Sep. 7, 2018, the entire contents of which is incorporated herein by reference.

TECHNICAL FIELD

The present disclosure relates to a system for producing a high voltage direct current (HVDC) voltage from different sources, such as, but not limited to, an external generator, an aircraft APU generator, an emergency or auxiliary generator and an engine generator. The system finds particular, but not exclusive, application in aircraft electrical systems and especially for so-called more electric aircraft (MEA).

BACKGROUND

The present disclosure describes power supply in aircraft but this is by way of example only and the principles of the disclosure could be applied to other power supply systems e.g. on ships or in large plants or the like.

Aircraft require electrical power to operate many parts of the aircraft system, including on-board flight control systems, lighting, air conditioning etc. The current and future generations of aircraft use more and more electrical control in place of convention hydraulic, pneumatic etc. control. Such MEA aircraft have advantages in terms of the size and weight of the controls and power systems as well as in terms of maintenance and reliability.

Most current large commercial aircraft use electricity, on-board, in the form of an AC fixed frequency and/or variable frequency network. Steps have been made to move from 115 V ac to 230 V ac and more recent developments have allowed power supplies to supply both ac and high voltage dc (HVDC) e.g. +/−270 V dc, providing improvements in terms of additional functionality, power supply simplification, weight savings and thus fuel efficiency.

Generally, voltage is provided on board aircraft in one of two (or more) ways. When the aircraft is on the ground, power comes from an external ground generator supplying, say 115 V ac at 400 Hz. An auto-transformer rectifier unit (ATRU) rectifies the supply voltage to provide voltages required for the different loads on the aircraft. Instead of an ATRU, the power can be rectified by active rectification using power flow controllers.

When the aircraft is in the air the power comes from the aircraft engine or aircraft power unit (APU) via a three-phase ac variable frequency generator VFG and power to the loads is provided via a simple 6-pulse rectifier.

U.S. Pat. No. 8,358,111 teaches a dual source electric power generating system that can provide both a regulated AC output and a regulated DC output.

The rectifier units in these known systems are complex and require the use of capacitors. Capacitors are, however, a common point of failure and can be responsible for 20% to 40% of power electronics failures. Also, the physics of capacitor charge storage mean that rapid or step-wise output regulation is difficult.

Based on the above, there is a need for improved power supply systems that overcome these problems.

SUMMARY

The present disclosure provides a power supply comprising first and second ac voltage generators both connected to one or more loads and a respective 6-pulse rectifier unit for rectifying ac voltage from each of the first and second power generators to a dc voltage output for the loads, wherein each of the first and second voltage generators comprises two 3-phase voltage sources separated by a phase shift, wherein the voltage output from each rectifier unit is coupled to the loads via a respective interphase inductor.

The phase shift is preferably 30 deg.

DETAILED DESCRIPTION

Figure 1:
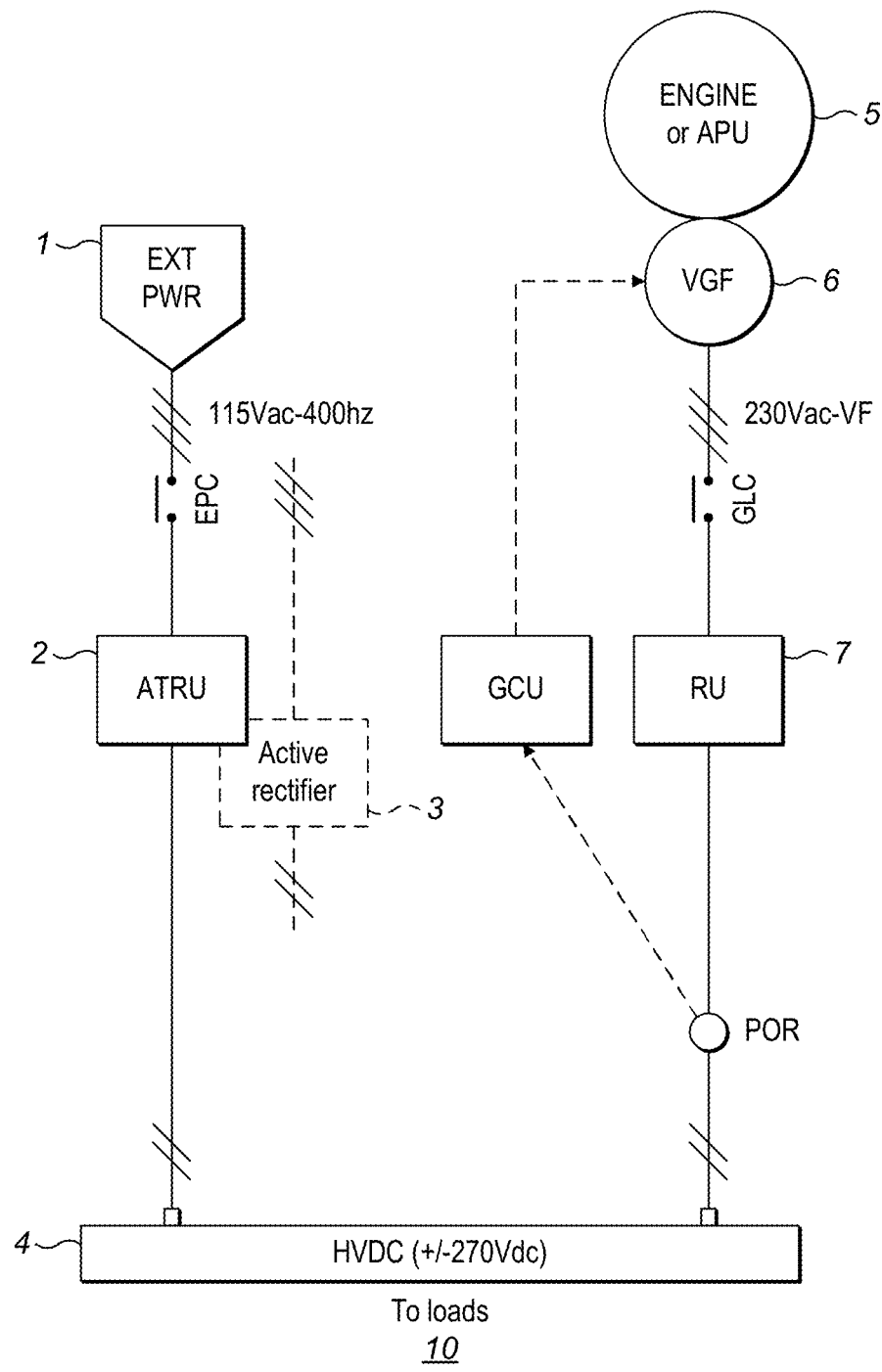
FIG. 1 is a schematic view of a conventional HVDC power supply system.

Referring to FIG. 1, the conventional systems mentioned above will be briefly described.

When the aircraft is on the ground, power is supplied to the loads 10 e.g. on-board systems from an external AC generator 1 via a rectifier—either an ATRU 2 or an active rectifier 3 that provides DC voltage 4 for the loads 10. During flight, the aircraft systems are powered from the aircraft engine or APU 5 via a variable frequency generator 6. The AC voltage is rectified by a rectifier unit 7 to provide the DC voltage 4 for the loads 10. A general control unit GCU regulates the power supply at the point of regulation POR at the dc end of the system. The HVDC bus is required to have a parallel-connected large bus capacitor to ensure voltage stability and to reduce voltage ripple to an acceptable level. This leads to a poor dynamic response of voltage regulation on fast load variation. The presence of a large capacitor can also affect the reliability of the whole power channel.

Figure 2:
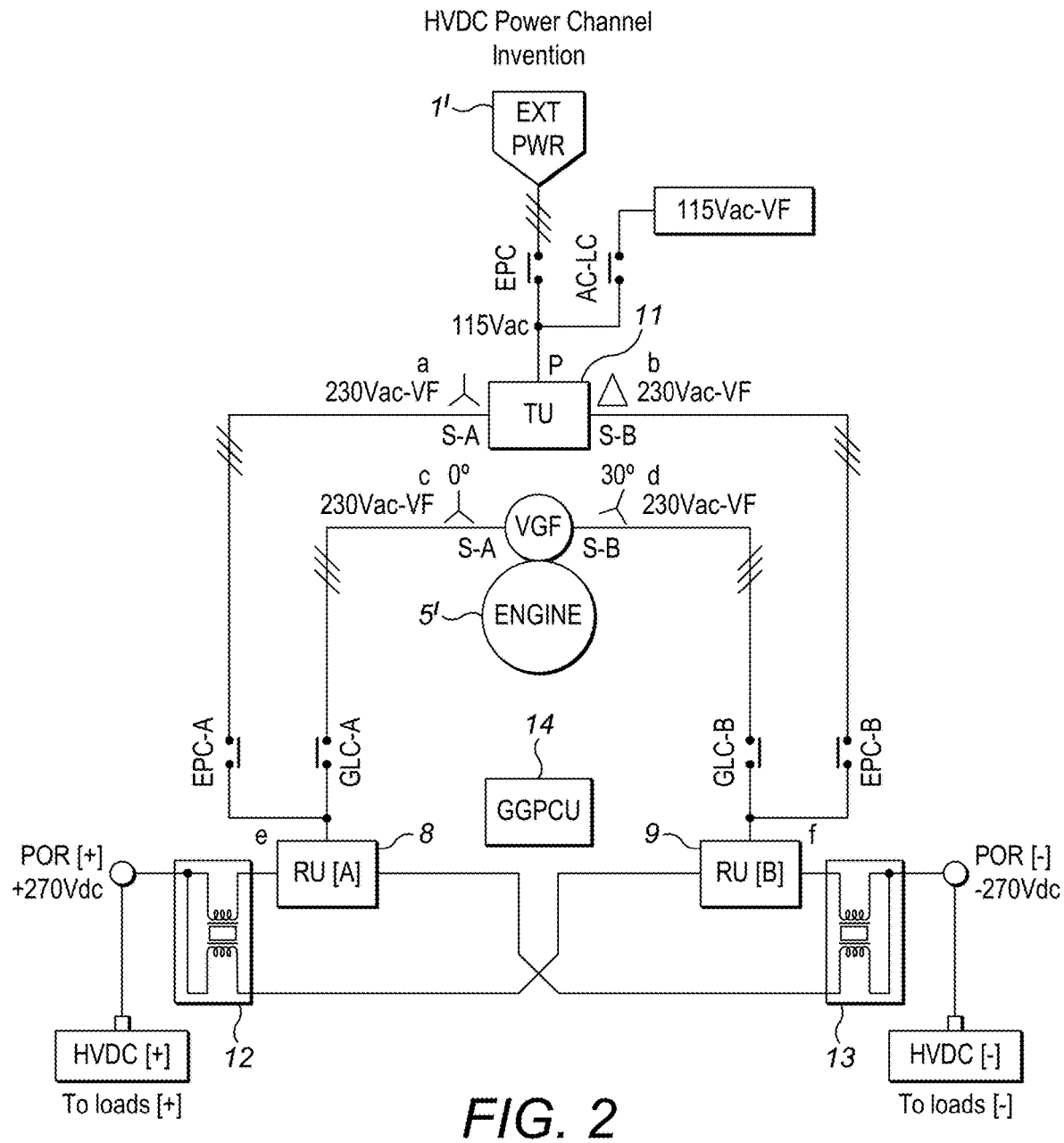
FIG. 2 is a schematic view of an HVDC power supply system according to this disclosure.

To overcome the problems of the prior art systems, the systems according to the present invention use dual 3-phase generators with a phase shift of preferably 30 deg, for each generator and interphase inductors to mutualise the rectifier units associated with the respective power sources as will be described further below with reference to FIGS. 2 to 4.

As with conventional systems, the aircraft is powered, when on the ground, by an external generator 1', via a transformer unit 11 and when in flight, by the aircraft engine or APU 5' via a VFG 6'. Each of these generators comprises two 3-phase voltage sources a,b,c,d separated by a 30 deg. phase shift. Each generator is associated with a respective 6-pulse rectifier RU 8,9.

To save weight, the two rectifier units 8,9 are mutualised between the transformer unit 11 and the engine/APU 5'. In more detail, the first rectifier unit 8 receives inputs from the first 3-phase source a,c of each generator and the second unit 9 receives inputs from the second 3-phase source b,d of each generator. The first rectifier unit 8 provides a first dc output e and the second rectifier unit 9 provides a second dc output f. The first dc output e is connected to the loads 10 and to the second rectifier unit 9 via a first interphase inductor 12. The second dc output f is connected to the loads 10 and to the first rectifier unit 8 via a second interphase inductor 13. Thus, the two sets of rectified voltages are coupled in parallel through the interphase inductors which minimises the voltage ripple on the dc bus without capacitors. The use of two parallel rectifier units also provides redundancy for the event of failure of one of the units. A control unit 14 regulates the power supply at the point of regulation POR at the dc end of the system.

The 12-pulse rectification technique caused by the dual 3-phase sources and the two 6-pulse rectifiers produces very low ripple without the need for a capacitor. Also, the point of failure that is the capacitor is avoided by use of the interphase inductors.

When the external power generator is disconnected, a 3-phase 115 V ac voltage can still be produced and be available for conventional loads by coupling the transformer unit 11 secondary windings to the VFG stators (separated by 30 deg). Thus, a 115V ac bus is powered from the external generator when operating on the ground, with the engine/APU stopped. This can be used for ground services on the aircraft. If the transformer unit 11 has its primary windings connected in a Wye configuration, access to ground and a single load supply is possible.

During flight, when the aircraft engine/APU are running and powering the loads, this 115 V ac bus can still be supplied without external power, through the transformer unit 11 operating in a reversed manner. In more detail, the TU secondary windings are powered from the VFG 6'. The transformer unit 11 converts its 230 V ac voltage back to 115 V ac. [The transformer unit (TU) having one primary winding and two secondary windings with a 30° phase shift (Wye Delta) between them is reversible 1) When the A/C is supplied from the external power, the 115 Vac bus is directly supplied from external power that supplies the TU primary winding and the 115 Vac bus connected in parallel. In this case the two TU secondary windings produce 2×230 Vac sets with a 30° phase shift. These two voltages are rectified by RUs and combined with interphase inductors to produce the HVDC bus.
2) When the A/C is supplied by the engine generators, the two VFG sets of 230 Vac voltage supply the RUs with a 30° phase shift and are combined with interphase inductors to produce HVDC. At the same time, the two 230 Vac outputs of a VFG supply respectively the two TU secondaries with a phase shift of 30°. The TU works in opposite direction (power flow is reversed) stepping down the 230 VAC voltages into a 3 phase AC 115V to supply the A/C AC bus.

Figure 3:
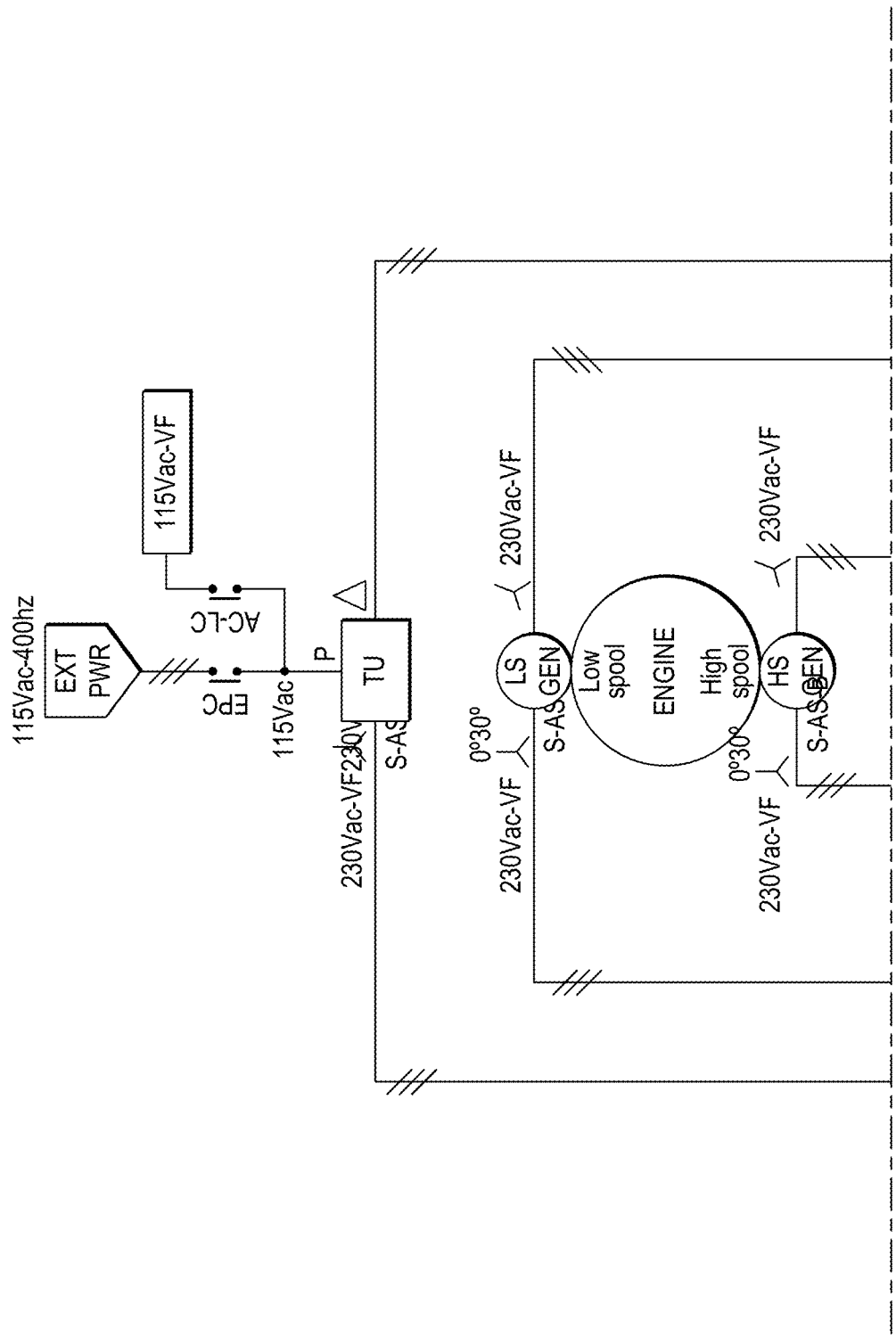
FIG. 3 is a variation of the system shown in FIG. 2 for a GTF engine.
Figure 3:
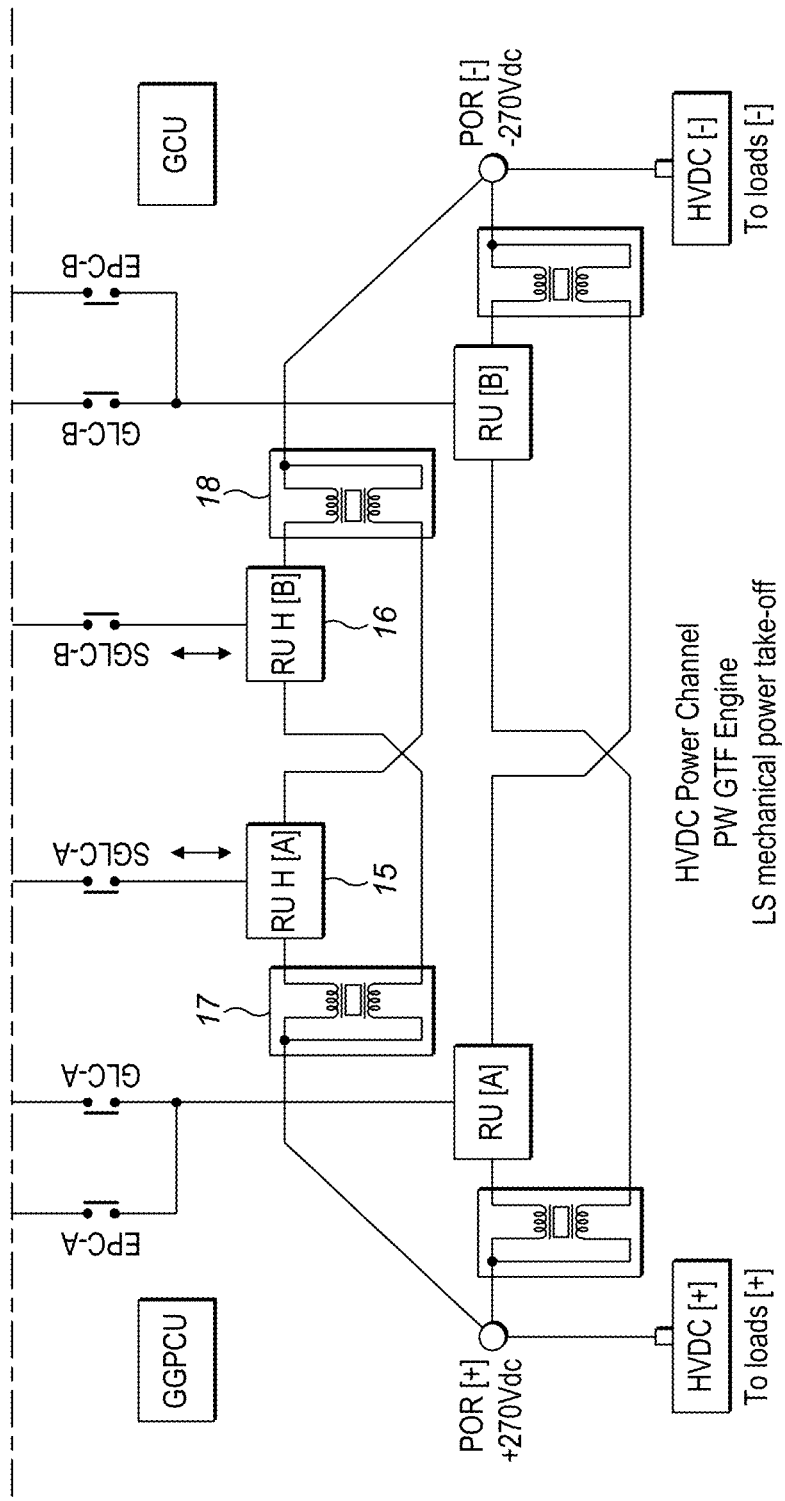

FIG. 3 shows a variation on the system described above, for use with a geared turbofan (GTF) engine. A GTF engine has a high spool and a low spool and it is considered desirable to provide two three-phase sources for each of the high and the low spool, each separated by a phase shift e.g. 30 deg. The system is comparable to the system of FIG. 2 for the low spool side of the engine and the external generator. In addition, though, the two sources for the high spool are connected into the output via two more rectifier units 15,16. These are also connected in parallel via respective interphase inductors 17,18 to operate in a manner similar to above, the outputs connected to the loads at the POR.

Figure 4:
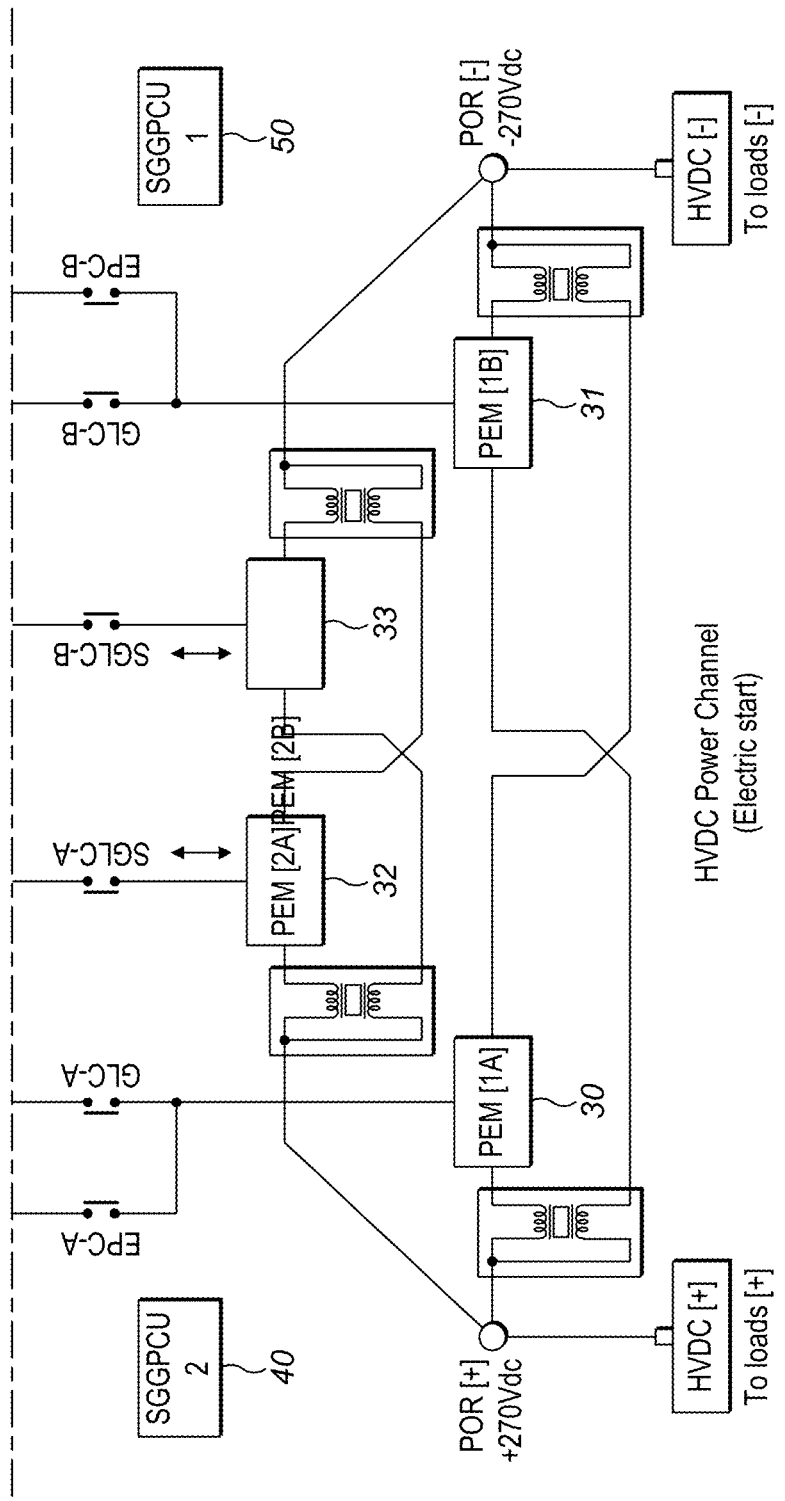
FIG. 4 is a variation of the system of FIG. 2 for an electric start motor.

A further modification of the concept, adapted for electric starter engines (of all types) is shown in FIG. 4. Here, instead of a VFG associated with the aircraft engine two signals from two signal generators 20,21, with phase shifts of 30 deg. are output to the loads. Instead of rectification units, 3-phase power reversible inverters, or power electronic modules (PEMs) 30,31,32,33 are used. A PEM can be a single module or several modules connected in parallel, thus sharing power flow in one or the other direction. The PEM outputs are provided to the loads via interphase inductors in a manner similar to that for the embodiment of FIG. 3 The overall system is managed by two redundant starter generator and ground power control units (SGGPCUs) 40,50.

When operating in generation mode, the gates of the switches of the PEMs can all be off. The PEMs operate in passive rectification mode. When starting the engine, the PEMs are supplied from the HVDC bus In addition to the 30° phase shift of the stators, the starter generator's input shaft can be keyed on the engine gearbox outputs so that there a mechanical angle shift between them and rotors leading to an electrical angle phase shift of the voltages generated of 15° by the first (or second) stator of the first generator and by the first (or, respectively, second) stator of the second generator. In generation mode, this brings further improved power quality/reduced voltage ripple on the HVDC bus (equivalent to 24-pulse rectification) when both machines are paralleled on the same bus. In engine start mode, this brings reduced torque ripple.

Further, the fact that the starter/generator are dual-star stators enables a built-in rotor position sensor and thus the so-called resolver deletion (cost, weight saving and improved reliability). Indeed, before the engine start sequence, we can stimulate one stator by a 3-phase e.m.f and measure the voltages generated on the other 3-phase stator, the ratio between stimuli magnitude and measured magnitude is a function of rotor position for a salient pole machine (variable reluctance).

The concepts described herein provide power supply systems that avoid the need for and problems associated with capacitors, as well as providing very low ripple and providing a smaller and lighter system with redundancy features for added safety. There is also no need for a heavy neutral cable from the ac source that is required in existing systems. The dc voltage can be smoothly and quickly regulated at the dc end of the supply.

The invention claimed is:
1. A power supply comprising:
first and second ac voltage generators, wherein both the first and second ac voltage generators are connected to one or more loads and wherein the first and second ac voltage generators are connected to respective first and second 6-pulse rectifier units for rectifying ac voltage from each of the first and second ac voltage generators to a dc voltage output for the loads,
wherein each of the first and second ac voltage generators comprises two 3-phase voltage sources separated by a phase shift,
wherein the voltage output from each rectifier unit is coupled to the loads via a respective interphase inductor; and
a third ac voltage generator connected to the one or more loads and having a further two 3-phase voltage sources separated by a phase shift and further comprising a respective further rectifier unit for each of the further two 3-phase voltage sources;
wherein:
a first rectifier unit receives inputs from a first 3-phase source (a,c) of each of the first and second ac voltage generators and a second rectifier unit receives inputs from a second 3-phase source (b,d) of each ac voltage generator;
wherein the first rectifier unit provides a first dc output (e) and the second rectifier unit provides a second dc output (f);
wherein the first dc output (e) is connected to the loads and to the second rectifier unit via a first interphase inductor, and the second dc output (f) is connected to the loads and to the first rectifier unit via a second interphase inductor; and wherein the two sources for the third ac voltage generator are connected into the output via two further rectifier units, which are also connected in parallel via respective interphase inductors to output the loads;

wherein the power supply is in combination with a geared turbofan engine, wherein the second ac voltage generator is associated with a high spool side of the engine and the third ac voltage generator is associated with a low spool side of the generator.

2. The power supply of claim 1, wherein the phase shift is 30 degrees.

3. The power supply of claim 1, wherein a first rectifier unit receives inputs from a first 3-phase source (a,c) of each ac voltage generator and a second rectifier unit receives inputs from a second 3-phase source (b,d) of each ac voltage generator, and wherein the first rectifier unit provides a first dc output and the second rectifier unit provides a second dc output (f), wherein the first dc output (e) is connected to the loads and to the second rectifier unit via a first interphase inductor, and the second dc output (f) is connected to the loads and to the first rectifier unit via a second interphase inductor.

4. The power supply of claim 1, further comprising a control unit arranged to regulate power supply to the loads.

5. An aircraft power supply, comprising the power supply of claim 1, wherein the first ac voltage generator is an external ground generator and the second ac voltage generator is an on-board generator.

6. The aircraft power supply of claim 5, wherein the external ground generator powers the loads when the aircraft is on the ground, and the on-board generator powers the loads when the aircraft is in flight.

* * * * *